United States Patent
Wandel

(10) Patent No.: US 10,567,194 B2
(45) Date of Patent: Feb. 18, 2020

(54) USER STATION FOR A BUS SYSTEM AND METHOD FOR INCREASING THE TRANSMISSION CAPACITY IN A BUS SYSTEM

(71) Applicant: Robert Bosch GmbH, Stuttgart (DE)

(72) Inventor: Thomas Wandel, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/126,741

(22) PCT Filed: Feb. 12, 2015

(86) PCT No.: PCT/EP2015/052988
§ 371 (c)(1),
(2) Date: Sep. 16, 2016

(87) PCT Pub. No.: WO2015/139892
PCT Pub. Date: Sep. 24, 2015

(65) Prior Publication Data
US 2017/0093596 A1 Mar. 30, 2017

(30) Foreign Application Priority Data
Mar. 19, 2014 (DE) .................. 10 2014 205 120

(51) Int. Cl.
| H04L 12/413 | (2006.01) |
| H04L 12/26 | (2006.01) |
| H04L 12/40 | (2006.01) |

(52) U.S. Cl.
CPC ........ *H04L 12/413* (2013.01); *H04L 43/0888* (2013.01); *H04L 2012/40215* (2013.01)

(58) Field of Classification Search
None
See application file for complete search history.

(56) References Cited

U.S. PATENT DOCUMENTS

| 9,432,289 B2* | 8/2016 | Hartwich | ............ G06F 13/4282 |
| 2004/0031854 A1* | 2/2004 | Chen | .................... G06F 13/4243 235/492 |

(Continued)

FOREIGN PATENT DOCUMENTS

| CN | 103562900 A | 2/2014 |
| CN | 103620574 A | 3/2014 |

(Continued)

OTHER PUBLICATIONS

International Search Report dated Apr. 22, 2015, of the corresponding International Application PCT/EP/2015/052988, filed on Feb. 12, 2015.

(Continued)

*Primary Examiner* — Alex Skripnikov
*Assistant Examiner* — Richard Schnell
(74) *Attorney, Agent, or Firm* — Norton Rose Fulbright US LLP; Gerard Messina

(57) ABSTRACT

A user station for a bus system and a method for increasing the transmission capacity in a bus system. The user station includes a communications control device for generating or reading a first message for/of at least one further user station of the bus system, where exclusive, collision-free access of a user station to a bus of the bus system is ensured at least temporarily; the communications control device being configured in such a manner, that it generates or reads the first message as a frame, which has a greater length than the maximum length of further frames, as which second messages are transmitted in the bus system, and the frame having data of the first message in unsegmented form.

8 Claims, 3 Drawing Sheets

(56) References Cited

U.S. PATENT DOCUMENTS

2008/0159260 A1* 7/2008 Vobbilisetty ............ H04L 69/08
370/351
2013/0326099 A1* 12/2013 Schmidt ............ H04L 29/12254
710/110
2014/0376553 A1* 12/2014 Arikawa ................. H04L 69/22
370/392

FOREIGN PATENT DOCUMENTS

| DE | 10000305 A1 | 7/2001 | | |
|---|---|---|---|---|
| WO | 2012146631 A1 | 11/2012 | | |
| WO | WO 2012146649 A1 * | 11/2012 | ......... | G06F 13/4282 |

OTHER PUBLICATIONS

Silvestre J. et al., "Impact of the use of large frame sizes in fieldbuses for multimedia applications", 18th IEEE International Conference on Emerging Techologies and Factory Automation, IEEE, Piscataway, NJ, USA, vol. 1, Sep. 19, 2005 (Sep. 19, 2005), pp. 433-440, XP010905362.
Florian Hartwich, "CAN with Flexible Data-Rate", Specification Version 1.0, http://www.semiconductors.bosch.de, 8 pages.

* cited by examiner

USER STATION FOR A BUS SYSTEM AND METHOD FOR INCREASING THE TRANSMISSION CAPACITY IN A BUS SYSTEM

FIELD

The present invention relates to a user station for a bus system and a method for increasing the transmission capacity in a bus system, which may be used primarily in bus systems that transmit data according to the CAN FD specification.

BACKGROUND INFORMATION

Use of the CAN bus system has become widespread for the communication between two or more bus users, such as a sensor(s), a control unit(s), etc. In the CAN bus system, messages are transmitted, using the CAN protocol, as is described in the CAN specification in ISO11898.

DE10 000 305 A1 describes the CAN (controller area network) and an expansion of the CAN referred to as TTCAN (time trigger CAN=time-triggered CAN. The media access control method used in the CAN is based on bit-by-bit arbitration. In the CAN, the bit-by-bit arbitration is carried out in light of a leading identifier inside of the message to be transmitted via the bus.

Recently, techniques such as CAN FD, in which messages are transmitted according to the specification "CAN with Flexible Data-Rate, Specification Version 1.0" (source: http://www.semiconductors.bosch.de), etc., have been proposed. In such techniques, the maximum possible transmission rate is increased to over a value of 1 Mbit/s by using a higher clock rate in the area of the data fields. Consequently, bit rates of greater than 1 Mbit per second (1 Mbps), 2 Mbps, 4 Mbps, and possibly higher, may now be used.

Therefore, more data may be transmitted within the same time by CAN FD than by CAN. However, in the course of the increase in data traffic in the bus system, it is desirable in some cases to increase the volume of data transmittable per unit time. Increasing data traffic in the bus system also generated due to an increasing number of users of the bus system.

SUMMARY

Therefore, an object of the present invention is to provide a user station for a bus system and a method, which solve the above-mentioned problems. In particular, a user station for a bus system and a method are provided, in which the data volume per unit time may be increased simply and cost-effectively.

The object may be achieved by a user station for a bus system in accordance with the present invention. The user station includes a communications control device for generating or reading a first message for/of at least one further user station of the bus system, where exclusive, collision-free access of a user station to a bus of the bus system is ensured at least temporarily; the communications control device being configured in such a manner, that it generates or reads the first message as a frame, which has a greater length than the maximum length of further frames, as which second messages are transmitted in the bus system; and the frame including data of the first message in unsegmented form.

The data volume per unit time is increased very simply and inexpensively by the user station. In particular, software expenditure for implementation, configuration and test storage of the ISO-TP 15765 transport protocol may be eliminated.

According to one embodiment variant, a UDS communication (UDS=unified diagnostic services) having a data frame of 4096 bytes may be used, by adapting the CAN FD medium to 4 kBytes. Consequently, the segmentation of the UDS services may be eliminated completely, since as a maximum, only a CAN FD frame (4 kB extended) is sent for a UDS service. Therefore, the ISO-TP 15765 transport protocol may be eliminated completely, thereby yielding the following advantages.

A further advantage is that a loading of the central processing unit (CPU) due to interruptions, which may also be called interrupt load, decreases due to a reduction of the 584 CAN frames of a UDS service to 1 CAN FD 4 kB extended frame.

In addition, it is advantageous that the computer resources such as a flash memory and memory having random access (read access memory=RAM) are reduced, since the software implementation of the ISO-TP 15765 transport protocol is eliminated and previously necessary, temporary storage (buffers) for segmenting a message are eliminated.

In addition, the effective transmission time is reduced. The reason for this is the elimination of the PCI-type control information of the 583 segmented frames, the elimination of the ISO-TP flow control frame, the elimination of the times between the reception of the frames, and the elimination of the CAN acknowledge of the user station in each CAN frame.

Advantageous further refinements of the user station are described herein.

In addition, the user station preferably includes a transceiver device for transmitting or receiving the first message or the second message.

The first message may be a UDS request.

To construct the first message, the communications control device is possibly configured in such a manner, that at the beginning, the first message includes a first field for receiving a protocol information type, then a second field for receiving the length of the first message, and subsequently a third field for receiving a service identification number of the first message. In this connection, the first field may contain 4 bits, the second field may contain 12 bits, and the third field may contain 1 byte. In addition, to construct the first message, the communications control device may be configured in such a manner, that the first message also includes a fourth field for receiving at least one self-contained information item about an operation carried out by the user station. In this connection, the fourth field may have a length of 4093 bytes.

According to one exemplary embodiment, the first message is a CAN FD frame having 4096 bytes.

The above-described user station may be part of a bus system, which includes a bus and at least two user stations that are interconnected by the bus in such a manner, that they are able to communicate with one another. In this connection, at least one of the at least two user stations is an above-described user station.

The above-mentioned object may also be achieved by a method for increasing the transmission capacity in a bus system in accordance with the present invention. The method includes the following steps: generating or reading a first message for/of at least one further user station of the bus system, using a communications control device, where exclusive, collision-free access of a user station to a bus of the bus system is ensured at least temporarily; the communications control device generating or reading the first message as a frame, which has a greater length than the maximum length of further frames, as which second messages are transmitted in the bus system, and the frame having data of the first message in unsegmented form.

The method provides the same advantages as mentioned above with regard to the user station.

Further possible implementations of the present invention also include combinations, not explicitly mentioned, of features or specific embodiments described above or in the following with regard to the exemplary embodiments. In this context, one skilled in the art will also add individual aspects as improvements or additions to the respective basic form of the present invention.

BRIEF DESCRIPTION OF THE DRAWINGS

In the following, the present invention is described in greater detail with reference to the figures, and in light of exemplary embodiments.

DETAILED DESCRIPTION OF EXAMPLE EMBODIMENTS

Figure 1:
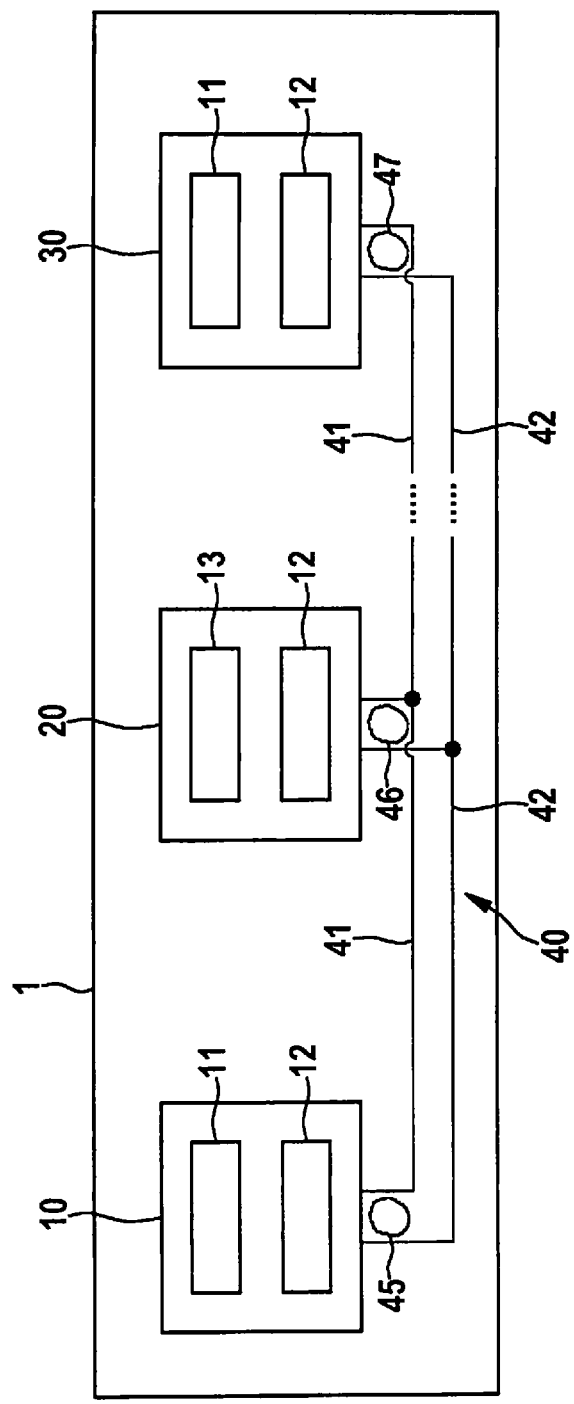
FIG. 1 shows a simplified block diagram of a bus system according to a first exemplary embodiment.

Unless otherwise indicated, identical or functionally equivalent elements have been provided with matching reference numerals in the figures.

FIG. 1 shows a bus system 1, which may be, for example, a CAN bus system, a CAN FD bus system, etc. Bus system 1 may be used in a vehicle, in particular, a motor vehicle, an airplane, etc., or in a hospital, etc.

In FIG. 1, bus system 1 has a plurality of user stations 10, 20, 30, which are each connected to a bus 40 by a first bus wire 41 and a second bus wire 42. Using the bus 40, messages 45, 46, 47 may be transmitted between individual user stations 10, 20, 30 in the form of signals. For example, user stations 10, 20, 30 may be control units or display devices of a motor vehicle.

As shown in FIG. 1, user stations 10, 30 each have a communications control device 11 and a transceiver device 12. On the other hand, user station 20 has a communications control device 13 and a transceiver device 12. Transceiver devices 12 of user stations 10, 20, 30 are each connected directly to bus 40, even if this is not shown in FIG. 1.

Communications control device 11 is used for controlling communication of respective user stations 10, 30, via bus 40, with another user station of the user stations 10, 20, 30 connected to bus 40. Transceiver devices 12 are each used for sending messages 45, 46, 47 in bus system 1 in the form of signals. Communications control device 13 is used for controlling communication of user station 20, via bus 40, with another user station of the user stations 10, 20, 30 connected to bus 40.

In this exemplary embodiment, communications control devices 11 are each configured for the use of UDS services. Transceiver 12 may be constructed as a conventional CAN transceiver. Communications control device 13 is also configured for the use of UDS services. Apart from that, communications control device 13 may be constructed as a conventional CAN controller.

Figure 2:
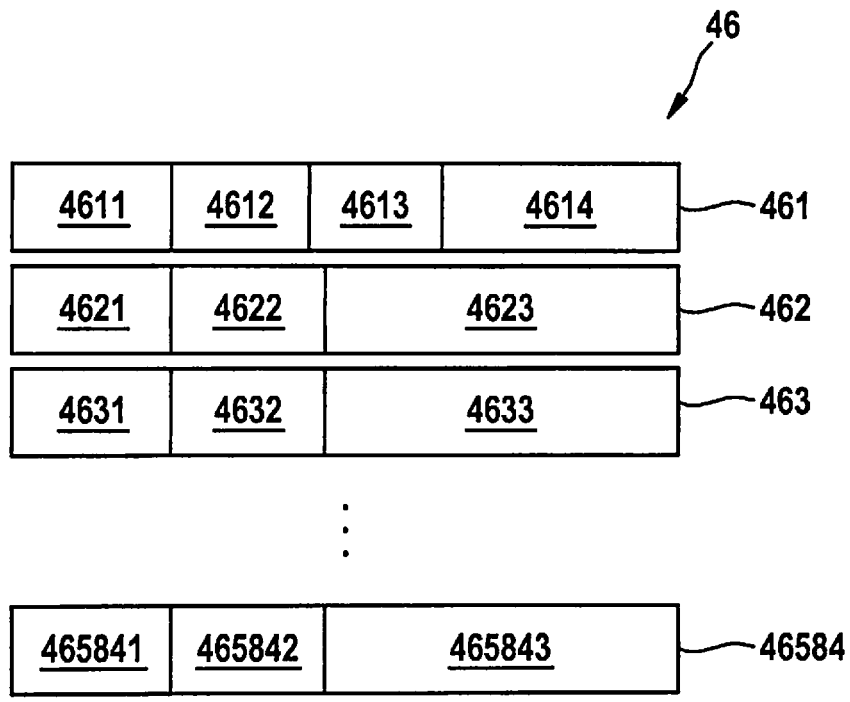
FIG. 2 shows a diagram for illustrating the construction of a message, which is sent by a user station of the bus system, in accordance with the first exemplary embodiment.

FIG. 2 shows a message 46 in more detail, which, according to this exemplary embodiment, is a UDS diagnostic request, which is sent to user station 20 or sent by user station 20. According to UDS 14229, message 46 is split up, in each instance, into 584 frames, namely, frames 461 through 46584, which are configured as CAN frames 1 through 584, each having 8 bytes. Frames 461 through 46584, that is, CAN frames 1 through 584, are sequentially transmitted by user station 20 onto bus 40 or received from there.

Accordingly, in message 46, the first CAN frame, that is, frame 461, has a field 4611 in which the protocol information type (PCI type) is contained in 4 bits; a field 4612 in which the length of message 46 is contained in 12 bits; a field 4613 in which the service identification number (service ID) of message 46 is contained in 1 byte; and a field 4614 in which service data (service ID) of message 46 is contained in 6 bytes.

On the other hand, the second CAN frame, that is, frame 462, has a field 4621 in which the protocol information type (PCI type) is contained in 4 bits; a field 4622 in which the sequence number (sequence no.) of the CAN frame is contained in 4 bits; and a field 4623 in which service data (service ID) of message 46 is contained in 7 bytes.

The third CAN frame, that is, frame 463, has a field 4631 in which the protocol information type (PCI type) is contained in 4 bits; a field 4632 in which the sequence number (sequence no.) of the CAN frame is contained in 4 bits; and a field 4633 in which service data (service ID) of message 46 is contained in 7 bytes.

The fourth to the 584th CAN frames are each constructed like second and third CAN frames 462, 463, as illustrated in FIG. 2 by the black points. Accordingly, the 584th CAN frame, that is, frame 46584, has a field 465841 in which the protocol information type (PCI type) is contained in 4 bits; a field 465842 in which the sequence number (sequence no.) of the 584th CAN frame is contained in 4 bits; and a field 465843 in which service data (service ID) of message 46 is contained in 7 bytes.

Message 46 represented in FIG. 2 has the maximum length of 8 bytes specified by UDS 14229 as being representable by CAN frames. Message 46 is split up in the segmentation specified by ISO-TP 15765. However, message 46 may also have fewer CAN frames of 8 bytes, if message 46 includes less data.

Figure 3:
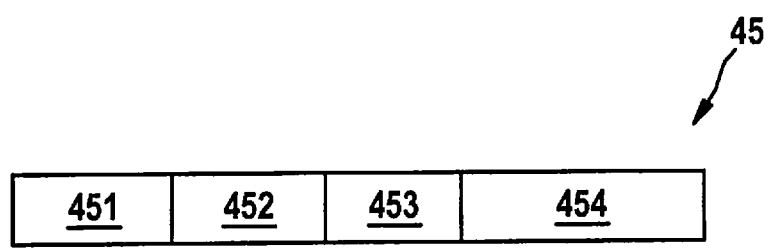
FIG. 3 shows a diagram for illustrating the construction of a message, which is sent by a further user station of the bus system, in accordance with the first exemplary embodiment.

In contrast to that, FIG. 3 shows the construction of a message 45, as sent to user stations 10, 30 or sent by user stations 10, 30. According to this exemplary embodiment, message 45 is also a UDS diagnostic request. Message 45 is a CAN FD frame having 4096 bytes. Message 45 has four fields, namely, fields 451 through 454. First field 451 of message 45 contains the protocol information type (PCI type) in 4 bits. Second field 452 contains the length of message 45 in 12 bits. Third field 453 contains the service identification number (service ID) of message 45 in 1 byte. Fourth field 454 contains the service data (service ID) of message 45 in 4093 bytes.

Therefore, messages 45, 46 are each constructed identically at their beginning. They have the same header. In message 46, however, 6 bytes of service data follow after its header, and subsequently, up to 583 CAN frames having, in each instance, 7 bytes of service data. On the other hand, in the case of message 45, only one data field, the field 454 having at least one byte, follows after its header.

Therefore, FIG. 3 represents an extended CAN FD frame. That is, the message is a CAN FD frame having more than 8 bytes, namely, e.g., 4 kBytes, and may also be referred to as an extended CAN FD frame or CAN FD extended frame.

Consequently, entire UDS messages may be transmitted in a CAN FD message.

Accordingly, communications control devices 11 of user stations 10, 30 are configured to generate or to read such messages 45 containing 4096 bytes. However, since message 45 is not segmented according to transport protocol ISO-TP 15765, transport protocol ISO-TP 15765 does not have to be implemented in specific communications control device 11 of user stations 10, 30. Thus, the data of message 45 are unsegmented.

Figure 4:
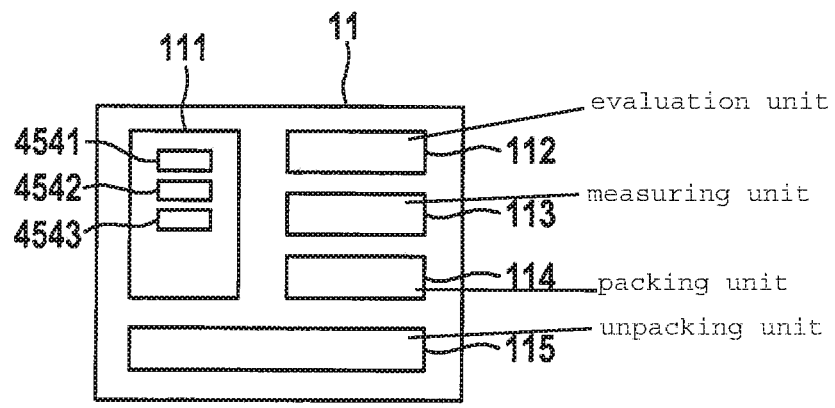
FIG. 4 shows a block diagram of a communications control device of a user station of the bus system, according to the first exemplary embodiment.

Instead, specific communications control device 11 of user stations 10, 30 is constructed as shown in FIG. 4.

According to FIG. 4, a communications control device 11 has a buffer 111, an evaluation unit 112, a measuring unit 113 and a packing unit 114. Buffer 111 is used for storing data 4541, 4542, 4543. Evaluation unit 112 is used to determine whether a condition for packing data 4541, 4542, 4543 into a message 45 is satisfied. Measuring unit 113 is used by evaluation unit 112. Packing unit 114 is used for packing data 4541, 4542, 4543 into a message 45. Unpacking unit 115 is used for unpacking a received message 45. This is explained in more detail with the aid of FIG. 5.

Figure 5:
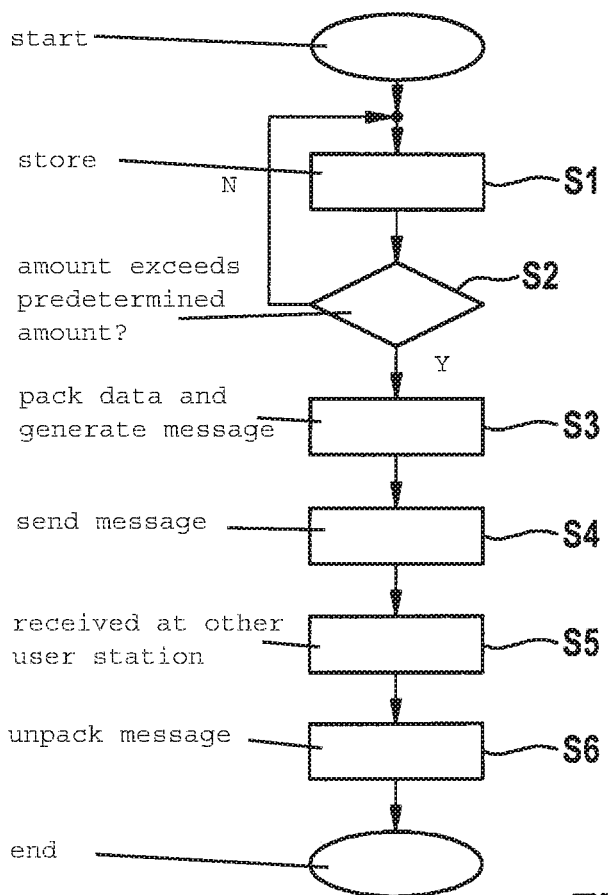
FIG. 5 shows a flow chart of a method for increasing the transmission capacity in a bus system, according to the first exemplary embodiment.

According to FIG. 5, in a method for increasing the transmission capacity in a bus system, data 4541, 4542, 4543 for a message 45, which is to be sent onto bus 40 with the aid of transceiver device 12, is stored, in a step S1, in buffer 111. Buffer 111 may be a RAM (RAM=read access memory=memory having random access), which is present in communications control device 11. Data 4541, 4542, 4543, which are to be packed into message 45, more specifically, into its fourth field 454, are collected in buffer 111. Data 4541, 4542, 4543 may come from one or more operations, which are carried out in user station 10. Data 4541, 4542, 4543 each include self-contained information items. Subsequently, the method continues to a step S2.

In step S2, evaluation unit 112 determines whether the amount of data 4541, 4542, 4543 in buffer 111 exceeds a predetermined amount, in this case, 4093 bytes, or whether a predetermined period of time has elapsed. For this, evaluation unit 112 uses measuring unit 113 after first data 4541 are stored in buffer 111, the measuring unit including, for example, a timer and/or a counter for counting the quantity of data 4541, 4542, 4543. If either the predetermined quantity of data 4541, 4542, 4543 is exceeded or the predetermined period of time is elapsed, evaluation unit 112 outputs a request to packing unit 113. The method then continues to a step S3. If neither the predetermined quantity is exceeded, nor the predetermined period of time is elapsed, the method returns to step S1.

In step S3, packing unit 113 packs data 4541, 4542, 4543 into fourth field 454 of message 45 and generates the message 45 having fields 451 to 454. The method then continues to a step S4.

In step S4, transceiver device 12 sends message 45 onto bus 40. The method then continues to a step S5.

In step S5, message 45 is transmitted on bus 40 and then received at the corresponding, other user stations 20, 30. The method then continues to a step S6.

In step S6, message 45 is unpacked again by the unpacking unit 115 in, for example, user station 30, and data 4541, 4542, 4543 are stored in buffer 111 of its communications control device 11 of user station 30. Consequently, data 4541, 4542, 4543 of user station 10 are now available for the operations of communications control device 11 of user station 30. After that, the method is ended or restarted.

In the method, step S1 preferably proceeds simultaneously or at least partially simultaneously to step S2, after first data 4541 have been stored in buffer 111. Consequently, it may be ensured that messages 45 are only sent, when data 4541 to be sent are also present. Alternatively, or in addition, it may be ensured that the data stored in buffer 111 are not retained too long.

Therefore, message 45 may include data, which are each sent individually as messages in the case of a customary CAN transmission. In the present exemplary embodiment, the length of message 45 is fixed and amounts to 4096 bytes. In this connection, if the data 4541 or 4541, 4542 or 4541, 4542, 4543 to be transmitted by a message 45 have a smaller number of bytes than the fixed length, the part of field 454 not needed is filled up, for example, with zeros.

According to a second exemplary embodiment, the number of bytes of field 454 is freely selectable. For example, field 454 may also only have at least 1 byte, in particular, more than 6 bytes or more than 64 bytes or more than 4093 bytes. In this manner, the filling-up of field 454 with, for example, zeros may be eliminated. However, regardless of the number of bytes of field 454, message 45 is not segmented, in particular, not split up in the segmentation specified by ISO-TP 15765. Therefore, data 4541 or 4541, 4542 or 4541, 4542, 4543 of message 45 are unsegmented.

All of the above-described refinements of bus system 1 of user stations 10, 20, 30, and of the method, according to the first and second exemplary embodiments, may be used individually or in all possible combinations. In addition, the following modifications are particularly conceivable.

The above-described bus system 1 according to the first and/or second exemplary embodiment is described in light of a bus system based on the CAN protocol. However, the bus system 1 according to the first and/or second exemplary embodiment may also be a different type of communications network. It is advantageous, but not a necessary condition, that in bus system 1, exclusive, collision-free access of a user station 10, 20, 30 to bus 40 or a common channel of bus 40 be ensured at least for particular time spans.

Bus system 1 according to the first and/or second exemplary embodiment is, in particular, a CAN network or a CAN FD network or a FlexRay network.

The number and configuration of user stations 10, 20, 30 in bus system 1 according to the first and/or second exemplary embodiment is a matter of choice. In particular, only user stations 10 or user stations 30 may also be present in bus system 1 of the first and/or second exemplary embodiment.

In order to obtain an even higher transmission rate, then, inside of the CAN frame of messages 45, 46, 47, the data transmission may be carried out analogously to data transmission protocols, such as Ethernet, etc.

The functionality of the above-described exemplary embodiments may also be implemented in a transceiver or a transceiver device 12 or a transceiver or a CAN transceiver or a transceiver chip set or a CAN transceiver chip set, etc. In addition, or as an alternative, it may be integrated into existing products. In particular, it is possible that the considered functionality be implemented either in communications control device 11 or in the transceiver as a separate electronic microchip (chip), or embedded in an integrated overall solution, in which only an electronic microchip (chip) is present.

What is claimed is:

1. A user station for a controller area network (CAN) bus system, comprising: a communications control device for generating or reading a first message for/of at least one further user station of the bus system, where exclusive, collision-free access of the user station to a bus of the bus system is ensured at least temporarily, the communications control device having an evaluation unit configured to generate or read the first message as a frame, that has a length greater than a maximum length of a second message as a frame communicated in the bus system, and the frame for the first message having data of the first message in unsegmented form; and a buffer; wherein a transmission capacity in the bus system is increased by storing all of the data for a message, which is to be sent onto the bus system, in the buffer of the communications control device, wherein all of the data for the message to be packed into a fourth field of the message are collected in the buffer, wherein the data for the message includes self-contained information items, wherein the first message is an extended Controller Area Network with Flexible Data rate (CAN FD) frame having 4096 bytes, wherein the second message is a standard CAN FD frame, wherein the data for the message includes an entire Unified Diagnostic Services (UIDS) request in a CAN FD message, wherein the evaluation unit determines whether an amount of data in the buffer exceeds a predetermined amount or whether a predetermined period of time has elapsed, the evaluation unit using a measuring unit after first data of the data for the message are stored in the buffer, the measuring unit including a timer and/or a counter for counting a quantity of the data, wherein if either a predetermined quantity of data is exceeded or a predetermined period of time is elapsed, the evaluation unit outputs a request to a packing unit, and wherein the packing unit packs the data for the message into one field of the message and generates the message having four fields, and a transceiver device transmits the message on the bus and the message is received at a corresponding one of the at least one further user stations, the data being unsegmented.

2. The user station as recited in claim 1, further comprising:
a transceiver device for sending or receiving the first message or the second message.

3. The user station as recited in claim 1, wherein to construct the first message, the communications control device is configured so that at a beginning, the first message includes a first field for receiving a protocol information type, then a second field for receiving the length of the first message, and subsequently a third field for receiving a service identification number of the first message.

4. The user station as recited in claim 3, wherein the first field contains 4 bits, the second field contains 12 bits, and the third field contains 1 byte.

5. The user station as recited in claim 4, wherein to construct the first message, the communications control device is configured so that the first message also includes a fourth field for receiving at least one self-contained information item about an operation carried out by the user station.

6. The user station as recited in claim 5, wherein the fourth field has a length of 4093 bytes.

7. A controller area network (CAN) bus system, comprising: a bus; at least two user stations which are interconnected to each other by the bus in such a manner that they are able to communicate with each other, wherein at least one of the user stations includes a communications control device for generating or reading a first message for/of at least one further user station of the bus system, where exclusive, collision-free access of the at least one of the user stations to a bus of the bus system is ensured at least temporarily, the communications control device being configured to generate or read the first message as a frame, that has a length greater than a maximum length of a second message as a frame communicated in the bus system, and the frame for the first message having data of the first message in unsegmented form; and wherein a transmission capacity in the bus system is increased by storing all of the data for a message, which is to be sent onto the bus system, in a buffer of the communications control device, wherein all of the data for the message to be packed into a fourth field of the message are collected in the buffer, wherein the data includes self-contained information items, wherein the first message is an extended Controller Area Network with Flexible Data rate (CAN FD) frame having 4096 bytes, wherein the second message is a standard CAN FD frame, wherein the data for the message includes an entire Unified Diagnostic Services (UIDS) request in a CAN FD message, wherein an evaluation unit determines whether the amount of data in the buffer exceeds a predetermined amount or whether a predetermined period of time has elapsed, the evaluation unit using a measuring unit after first data of the data are stored in the buffer, the measuring unit including a timer and/or a counter for counting a quantity of the data, wherein if either a predetermined quantity of data is exceeded or a predetermined period of time is elapsed, the evaluation unit outputs a request to a packing unit, and wherein the packing unit packs the data for the message into one field of the message and generates the message having four fields, and a transceiver device transmits the message on the bus and the message is received at a corresponding one further user station, the data being unsegmented.

8. A method for increasing the transmission capacity in a controller area network (CAN) bus system, the method comprising: generating or reading, using a communications control device, a first message for/of at least one further user station of the bus system, where exclusive, collision-free access of a user station to a bus of the bus system is ensured at least temporarily, the communications control device generating or reading the first message as a frame, that has a length greater than a maximum length of a second as a frame communicated in the bus system, and the frame of the first message having data of the first message in unsegmented form; wherein a transmission capacity in the bus system is increased by storing all of the data for a message, which is to be sent onto the bus system, in a buffer of the communications control device, wherein all of the data for the message to be packed into a fourth field of the message are collected in the buffer, wherein the data for the message includes self-contained information items, wherein the first message is an extended Controller Area Network with Flexible Data rate (CAN FD) frame having 4096 bytes, wherein the second message is a standard CAN FD frame, wherein the data for the message includes an entire Unified Diagnostic Services (UIDS) request in a CAN FD message, wherein an evaluation unit determines whether an amount of data in the buffer exceeds a predetermined amount or whether a predetermined period of time has elapsed, the evaluation unit using a measuring unit after first data of the data for the message are stored in the buffer, the measuring unit including a timer and/or a counter for counting a quantity of the data, wherein if either a predetermined quantity of data is exceeded or a predetermined period of time is elapsed, the evaluation unit outputs a request to a packing unit, and wherein the packing unit packs the data for the message into one field of the message and generates the message having four fields, and a transceiver device transmits the message on the bus and the message is received at a corresponding one of the at least one further user stations, the data being unsegmented.

* * * * *